United States Patent
Fujine et al.

(10) Patent No.: US 8,531,614 B2
(45) Date of Patent: Sep. 10, 2013

(54) DISPLAY DEVICE AND TELEVISION RECEIVER

(75) Inventors: Toshiyuki Fujine, Osaka (JP);
Tomoharu Noutoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/578,666

(22) PCT Filed: Mar. 10, 2011

(86) PCT No.: PCT/JP2011/055668
§ 371 (c)(1),
(2), (4) Date: Aug. 13, 2012

(87) PCT Pub. No.: WO2011/114988
PCT Pub. Date: Sep. 22, 2011

(65) Prior Publication Data
US 2012/0307163 A1  Dec. 6, 2012

(30) Foreign Application Priority Data

Mar. 15, 2010 (JP) .................................. 2010-057709
Mar. 9, 2011 (JP) .................................. 2011-051470

(51) Int. Cl.
*H04N 9/12* (2006.01)
(52) U.S. Cl.
USPC ......................................... 348/791; 348/708
(58) Field of Classification Search
USPC ....................................................... 348/791
See application file for complete search history.

(56) References Cited

U.S. PATENT DOCUMENTS

| 6,681,053 | B1 | 1/2004 | Zhu | |
|---|---|---|---|---|
| 2004/0174389 | A1 | 9/2004 | Ben-David et al. | |
| 2005/0122294 | A1* | 6/2005 | Ben-David et al. | 345/87 |
| 2007/0195230 | A1 | 8/2007 | Kuribayashi et al. | |
| 2008/0316235 | A1* | 12/2008 | Okazaki et al. | 345/694 |
| 2009/0322662 | A1 | 12/2009 | Yoshida et al. | |

FOREIGN PATENT DOCUMENTS

| JP | 2001-117529 A | 4/2001 |
|---|---|---|
| JP | 2005-523465 A | 8/2005 |
| JP | 2007-219350 A | 8/2007 |
| WO | 03/088203 A1 | 10/2003 |
| WO | 2006/019025 A1 | 2/2006 |
| WO | 2008-090845 A1 | 7/2008 |

* cited by examiner

*Primary Examiner* — Jefferey Harold
*Assistant Examiner* — Justin Sanders
(74) *Attorney, Agent, or Firm* — Birch, Stewart, Kolasch & Birch, LLP

(57) ABSTRACT

Disclosed is a display device in which high resolution representation is made by generating and displaying display data for each sub-pixel, and in which reduction in image quality is improved. The display device is provided with a display panel in which one pixel is constructed from sub-pixels of at least 4 colors. The display device generates the display data for each sub-pixel in accordance with an input image signal, and displays the display data on the display panel. Within the sub-pixels, high brightness sub-pixels which are the two sub-pixels having the highest brightness are arranged alternately with the other sub-pixels. Also, the area of each high brightness sub-pixel is smaller than that of the other sub-pixels. In a preferred example, the areas of the two sub-pixels having the highest brightness and the areas of the other two sub-pixels have area ratios in the following order: 1.0:1.0:1.6:1.6.

2 Claims, 19 Drawing Sheets

FIG. 4
(A)
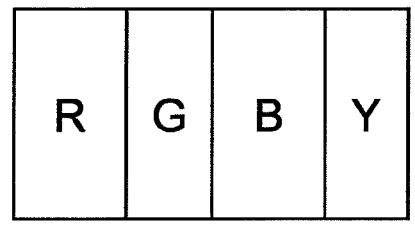
(B)
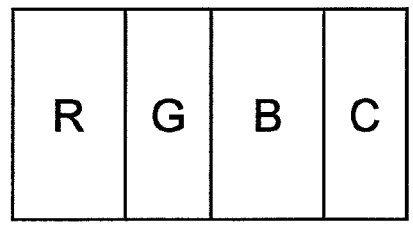
(C)
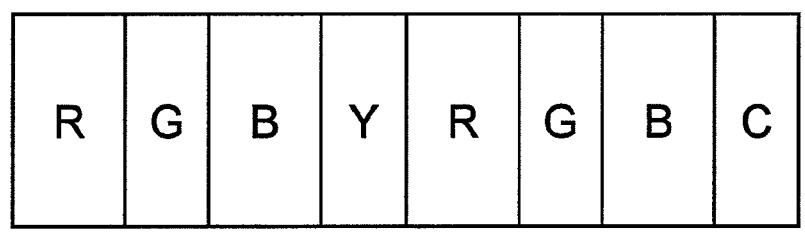

FIG. 5

| R | G | B | Y | R | C |
|---|---|---|---|---|---|
| Y | R | C | R | G | B |
| R | G | B | Y | R | C |
| Y | R | C | R | G | B |

FIG. 6
(A)
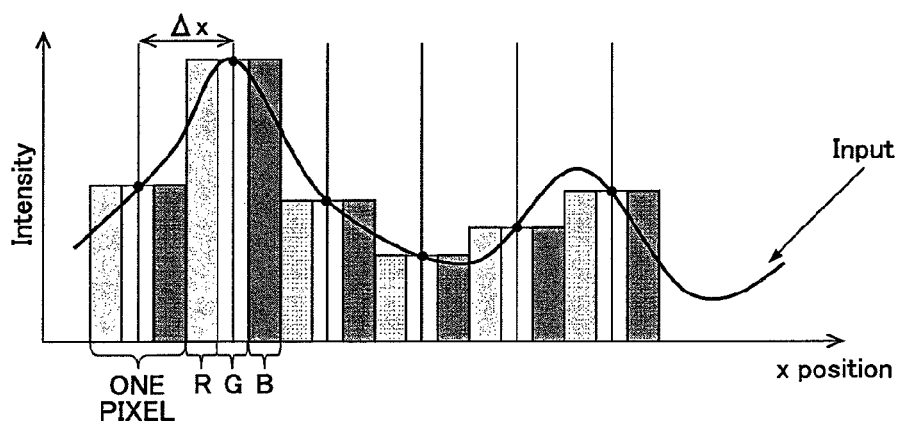
(B)
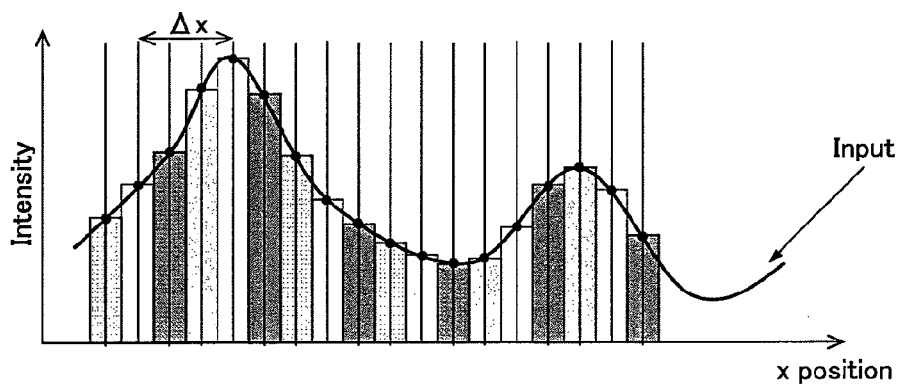

FIG. 7
(A)
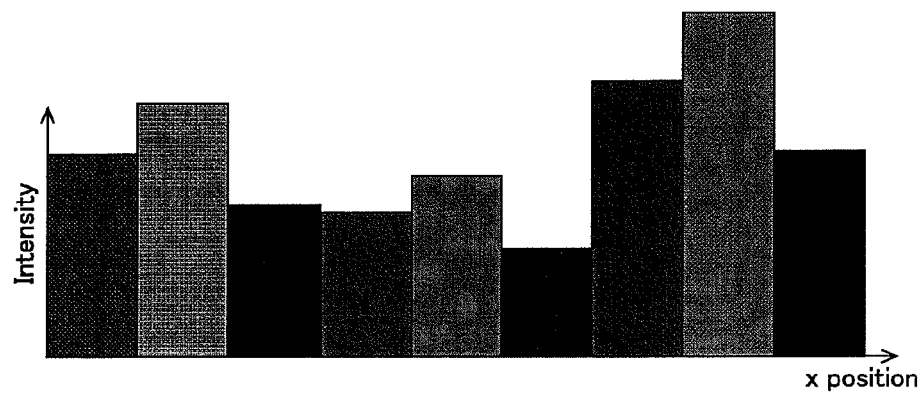
(B)
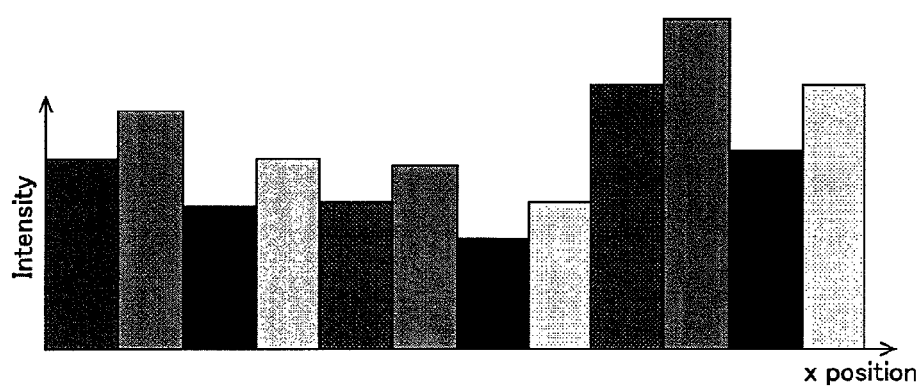

DISPLAY DEVICE AND TELEVISION RECEIVER

TECHNICAL FIELD

The present invention relates to a display device and a television receiver and more specifically to a display device and a television receiver supporting multi-primary-color display such as that using RGBY.

BACKGROUND ART

Various types of display have conventionally been developed as products that each form an image using pixels as a displaying means to display information or a video image. For example, a display is common whose each one pixel is configured by three primary-color sub pixels that are those of red (R), green (G), and blue (B) and the display thereby executes color display. These sub pixels are usually realized by using color filters. In such a color display technique, expansion of color reproducibility has recently been considered to improve the display appearance quality.

Whereas, a what-is-called multi-primary-color display has been developed that is adapted to expand regions in a chromaticity diagram for chromatic colors and to improve brightness efficiency by increasing the number of the primary colors to four or more primary colors by using new colors other than the three primary colors of "R", "G", and "B". Displays under consideration include, for example, a display employing an RGBY pixel configuration formed by adding Y (yellow) to R, G, and B, and a display employing an RGBW pixel configuration formed by adding W (white) to R, G, and B.

On the other hand, a sub-pixel sampling technique is present according to which sampling is executed for an input video image signal for each of sub pixels constituting a pixel to execute high-definition video-image expression by improving the resolution property of a display. The sub-pixel sampling technique is a technique of regarding each of sub pixels as one pixel for, for example, pixels each configured by the three sub pixels of R, G, and B, and reproducing brightness for each of the sub pixels. In this case, when the R, G, and B are disposed in the horizontal direction, the sampling is executed using the sampling frequency in the horizontal direction that is increased to a sampling frequency three times as high as the conventional sampling frequency. The R, G, and B sub pixels are driven based on signals sampled that correspond to the sub pixels.

Concerning techniques of improving the resolution property, for example, Patent Document 1 discloses a technique that aims at improving the resolution of a black-and-white text or a graphic image rendered, and narrowing color fringes. According to this technique, RGB image data is displayed that is produced by interleaving a gray scale image to an image that is three times as long as its original length in the horizontal direction and low-pass-filtering the resultant image.

PRIOR ART DOCUMENT

Patent Document
Patent Document 1: Japanese Laid-Open Patent Publication No. 2001-117529

SUMMARY OF THE INVENTION

Problems that the Invention is to Solve

When sampling is executed for an input video image signal and, thereby, video image expression is executed using digital data, a phenomenon generally occurs that degrades the video image appearance quality during processing of a digital image. For example, in the frequency axis direction, an interference pattern (beats) is generated by folding back in the low frequency region of signals at the Nyquist frequency that is a half of the sampling frequency, or higher. Problems also arise such as color shifting generated due to variation of the apparent tone of each of R, G, and B against the input (color aliasing).

These problems are able to be suppressed to some extent by setting a sampling frequency suitable for the appearance quality of an input video image and executing proper digital processing. However, there have been cases where satisfying video image appearance quality is not always maintained due to factors such as the pixel arrangement and the sampling method used. For example, in the case where it is attempted to improve the resolution property using the sub-pixel sampling in a common display expressing the three primary colors of R, G, and B as one pixel, when a video image is input that has a high spatial frequency such as that expressing, for example, black portions and white portions alternately arranged, degradation of the video image appearance quality may be conspicuous due to the beats, etc.

The present invention was conceived in view of the above circumstances and an object thereof is to provide a display device and a television receiver that enable high-resolution expression using a process of producing display data for each sub pixel and causing the display data to be displayed and that improve the degradation of the video image appearance quality occurring due to the process.

Means to Solve the Problems

To solve the above problems, a first technical means of the present invention is a display device comprising: a display panel in which one pixel is composed of four sub pixels for four colors of red, green, blue, and yellow; and a display control portion that produces display data based on an input video image signal for each of the sub pixels, the display control portion causing the display panel to display the display data thereon, wherein on the display panel, the high-brightness sub pixels for green and yellow that are top two highest-brightness sub pixels and the other sub pixels for red and blue are alternately disposed in order of red, green, blue, and yellow, areas of the top two highest-brightness sub pixels are equal to each other, areas of the other two sub pixels are equal to each other, a ratio of the area of each of the top two highest-brightness sub pixels to the area of each of the other two sub pixels is 1.0:1.6, and the display control portion executes sampling for the input video image signal corresponding to positions of the sub pixels regarding each of the sub pixels as one pixel, and executes sub-pixel sampling to produce the display data for each of the sub pixels.

A second technical means is a television receiver comprising the display device of the first technical means.

Effect of the Invention

A display device and a television receiver are able to be provided that enable high-resolution expression using a process of producing display data for each sub pixel and causing the display data to be displayed and that improve the degradation of the video image appearance quality occurring due to the process.

BRIEF DESCRIPTION OF DRAWINGS

FIG. 4 is a diagram of exemplary sub-pixel configurations applicable to the present invention.

FIG. 5 is a diagram of another exemplary sub-pixel configuration applicable to the present invention.

FIG. 6 is a diagram for explaining pixel sampling and sub-pixel sampling.

FIG. 7 is a diagram of an example of states of picture cell values of a video image signal.

BEST MODES FOR CARRYING OUT THE INVENTION

Figure 1:
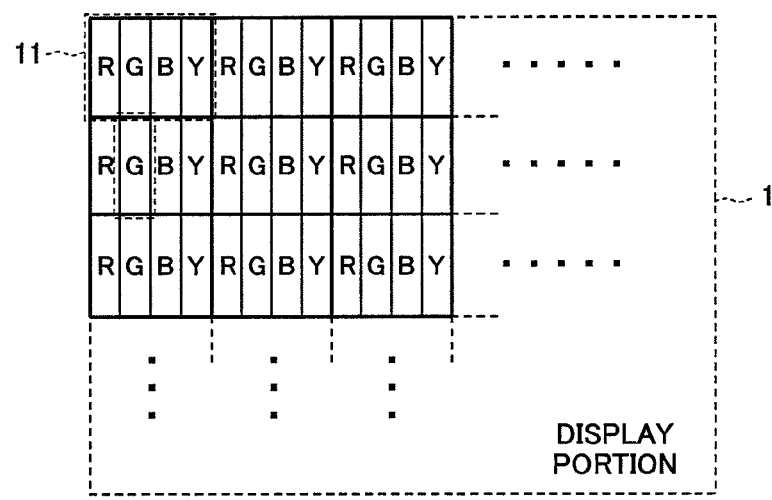
FIG. 1 is a schematic diagram of an exemplary configuration of a display portion of a liquid crystal display device applicable with the present invention.

FIG. 1 is a schematic diagram of an exemplary configuration of a display portion of a display device applicable with the present invention, and is a diagram of a display portion 1 having an RGBY pixel configuration. In this case, one pixel 12 has an RGBY pixel configuration. Each pixel of a color image displayed by the display portion 1 is configured by an R sub pixel, a G sub pixel, a B sub pixel, and a Y sub pixel that respectively correspond to "R (red)", "G (green)", "B (blue)", and "Y (yellow)".

The same holds in the cases of an RGB pixel configuration and pixel configurations such as those of RGBW (white) and RGBC (cyan). For RGB, one pixel 11 is configured by an R, a G, and a B sub pixels. For RGBW, RGBC, etc., the one pixel 11 is respectively configured by: an R, a G, a B, and a W sub pixels; and an R, a G, a B, and a C sub pixels. A five-color pixel configuration, etc., may also be employed such as that of RGBYC. The present invention is applicable to a display device that includes a display panel whose each one pixel (pixel) is configured by four or more sub pixels of different colors.

Figure 2:
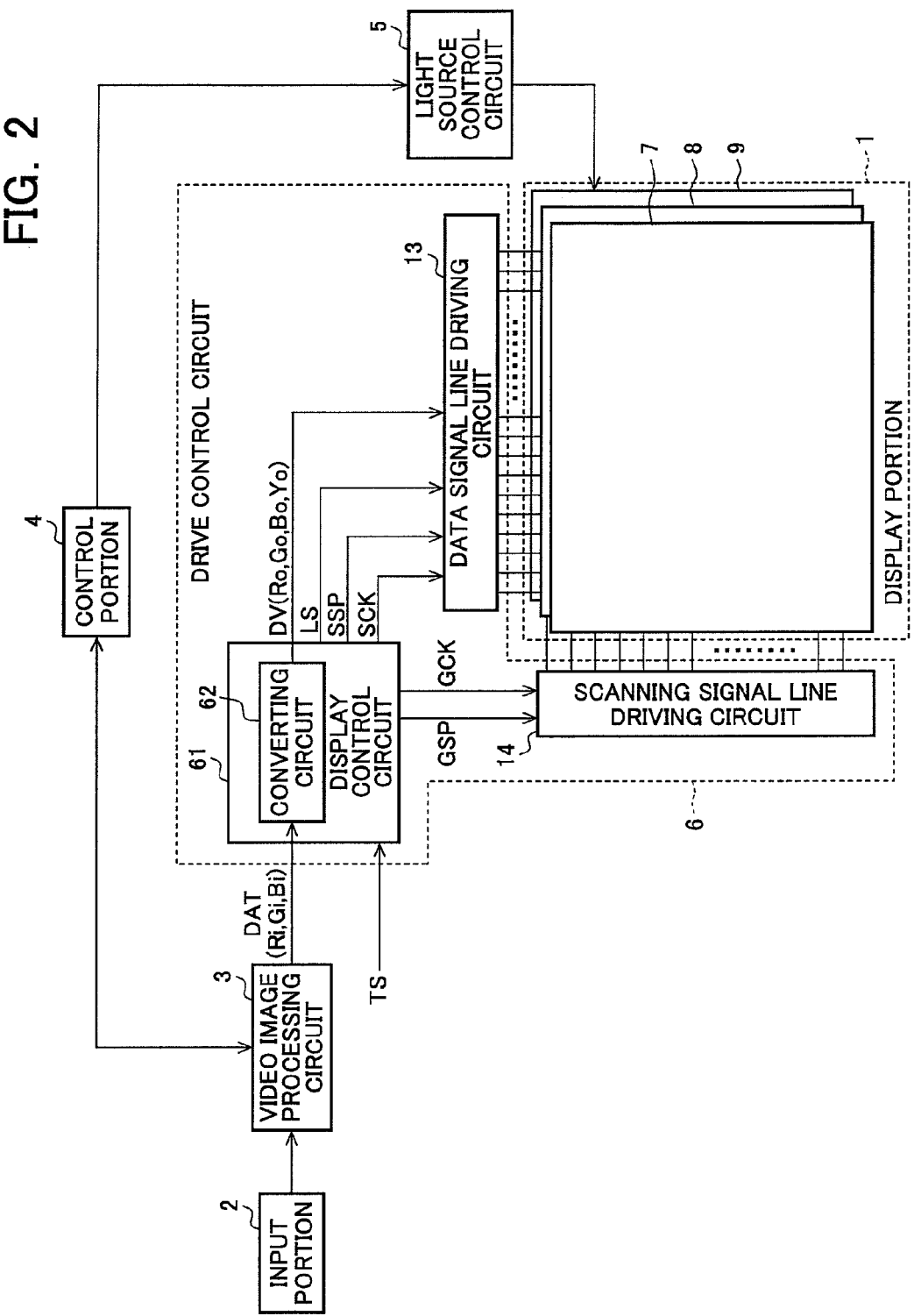
FIG. 2 is a block diagram of the liquid crystal display device applicable with the present invention.

FIG. 2 is a block diagram of the display device to which the present invention is applicable. The block diagram depicts a video image display control portion of the display device. The present invention is applicable to: a display device employing a conventionally common pixel configuration whose one pixel is configured by an R, a G, and a B sub pixels; a display device employing a multi-primary-color pixel configuration such as that of RGBY, RGBC, or RGBYC; and a display device employing a pixel configuration such as that of RGBW.

A liquid crystal display device includes the display portion 1, an input portion 2, a video image processing circuit 3, a control portion 4, a light source control circuit 5, and a drive control circuit 6. The display portion 1 includes an active-matrix color display panel. The drive control circuit 6 produces a driving signal to drive the display portion 1.

The input portion 2 is an interface to input a video image signal such as a digital broadcast signal. The video image processing circuit 3 executes various kinds of signal processing for an input video image signal from the input portion 2. The control portion 4 includes: a CPU controlling operations of the liquid crystal display device; a memory; etc. The light source control circuit 5 adjusts the brightness of a backlight light source by controlling the electric power supplied to the backlight light source constituting the display portion 1 according to a control order from the controlling portion 4.

The display portion 1 includes a color filter 7, a liquid crystal panel main body 8, and the backlight light source 9. The liquid crystal panel main body 8 is provided with a plurality of data signal lines and a plurality of scanning signal lines that cross the data signal lines. The liquid crystal panel main body 8 and the color filter 7 constitute a color liquid crystal panel that includes a plurality of pixel forming portions disposed in a matrix. The backlight light source 9 is a light source illuminating the liquid crystal panel main body 8.

The display portion 1 employing the RGBY pixel configuration will be described as an example. The drive control circuit 6 includes a display control circuit 61, a data signal line driving circuit 13, and a scanning signal line driving circuit 14. The display control circuit 61: receives a data signal DAT (Ri, Gi, and Bi) from the video image processing circuit 3, and a timing control signal TS from a timing controller not depicted; and outputs a digital video image signal DV (Ro, Go, Bo, Yo), a data start pulse signal SSP, a data clock signal SCK, a latch strobe signal LS, a gate start pulse signal GSP, a gate clock signal GCK, etc.

Each pixel 11 of the display portion 1 is configured by an R, a G, a B, and a Y sub pixels. The data signal DAT is configured by three primary color signals (Ri, Gi, and Bi) that respectively correspond to three primary colors of red, green, and blue. The display control circuit 61 includes a converting circuit 62 that converts the input primary color signals (Ri, Gi, and Bi) respectively corresponding to the three primary colors of R, G, and B into an output primary color signals (Ro, Go, Bo, and Yo) respectively corresponding to four primary colors of R, G, B, and Y. The digital video image signal DV is the output primary color signals (Ro, Go, Bo, and Yo) output from the converting circuit 62 and, using these, a color image to be displayed on the display portion 1 is displayed.

The data start pulse signal SSP, the data clock signal SCK, the latch strobe signal LS, the gate start pulse signal GSP, the gate clock signal GCK, etc., are timing signals to control the timings to display an image on the display portion 1.

The data signal line driving circuit 13 receives the digital image signal DV (Ro, Go, Bo, and Yo), the data start pulse signal SSP, the data clock signal SCK, and the latch strobe signal LS output from the display control circuit 11, and applies a data signal voltage as a driving signal to the data signal line of each pixel to charge the pixel capacity of each sub pixel of the display portion 1.

The scanning signal line driving circuit 14 sequentially applies active scanning signals (scanning signal voltages to turn on TFTs) to the scanning signal lines in the display portion 1 based on the gate start pulse signal GSP and the gate clock signal GCK output from the display control circuit 61.

Thereby, a voltage corresponding to the digital video image signal DV is held in the pixel capacity of each sub pixel and is applied to a liquid crystal layer. As a result, a color image indicated by the digital video image signal DV is displayed on the display portion 1 by RGBY color filters disposed on each sub pixel.

The display device is able to be configured as a television receiver. The television receiver includes a means to tune and demodulate a broadcast signal received using an antenna, to decode the demodulated signal, and to produce a reproduction video image signal; and inputs the reproduction video image signal into the video image processing circuit 3 through the input portion 2. Thereby, the broadcast signal received is enabled to be displayed on the display portion 1. The present invention is able to be configured as the display device and the television receiver including the display device.

Figure 3:
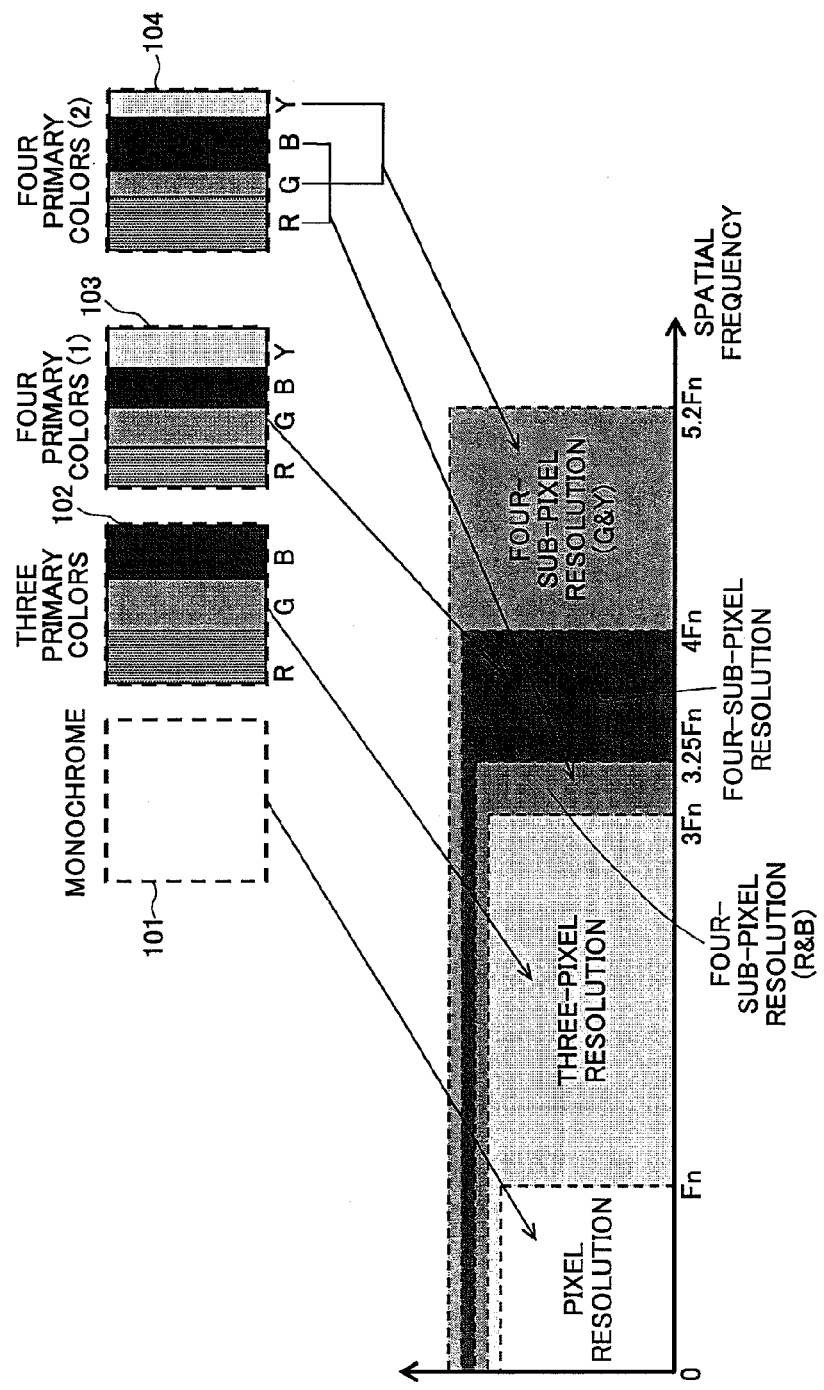
FIG. 3 is a diagram for explaining resolution acquired corresponding to each sub-pixel configuration.

FIG. 3 is a diagram for explaining resolution acquired corresponding to each sub-pixel configuration. The axis of abscissa of FIG. 3 represents the spatial frequency acquired by each sub-pixel configuration.

In FIG. 3, such pixel configurations are compared with each other as: a first pixel configuration 101 that is monochrome; a second pixel configuration 102 by three sub pixels for R, G, and B; a third pixel configuration 103 by sub pixels for R, G, B, and Y; and a fourth pixel configuration 104 by sub pixels for R, G, B, and Y. The third pixel configuration 103 has a configuration whose areas of its R, G, B, and Y sub pixels are same having ratios of 1:1:1:1. The fourth pixel configuration 104 has area ratios of R:B:G:Y=1.6:1.0:1.6:1.0 for its R, G, B, and y sub pixels.

For example, a full-high-vision (HD) panel is assumed that has 1,920 pixels therein in its horizontal direction. Based on one pixel/dot, for the first pixel configuration 101 that is monochrome, the spatial frequency indicating the pixel resolution is denoted by "Fn". In this case, 1,920 pixels are 1,920 pixels=1,920 dots on the full-HD panel and the full-HD panel has resolution corresponding to one pixel.

In the second pixel configuration 102 by the sub pixels for R, G, and B, one pixel is configured by three sub pixels having equal areas and, therefore, its spatial frequency is 3 Fn that is three times as high as Fn. The full-HD panel has dots thereon that are 1,920 pixels×3 sub pixels=5,760 dots and its resolution corresponds to 0.33 pixels.

In the third pixel configuration 103 by the sub pixels for R, G, B, and Y, one pixel is configured by four sub pixels having equal areas and, therefore, its spatial frequency is 4 Fn that is four times as high as Fn of the monochrome configuration. The full-HD panel has dots thereon that are 1,920 pixels×4 sub pixels=7,680 dots and its resolution corresponds to 0.25 pixels. Therefore, with the third pixel configuration 103 of RGBY, the resolution is 1.33 times as fine as that with the second pixel configuration of RGB.

In the fourth pixel configuration 104 by the sub pixels for R, G, B, and Y, one pixel is configured by the four sub pixels having ratios of R:G:B:Y=1.6:1.0:1.6:1.0. Therefore, the spatial frequency of each of R and B each having the ratio of 1.6 is Fn×5.2/1.6=3.25 Fn. The spatial frequency of each of G and Y each having the ratio of 1.0 is Fn×5.2/1.0=5.2 Fn.

For the R and the B sub pixels, the full-HD panel has dots that are 1,920×5.2/1.6=6,240 dots and its resolution corresponds to 0.31 pixels. For the G and the Y sub pixels, the full-HD panel has dots that are 1,920 pixels×5.2/1.0=9,984 dots and its resolution corresponds to 0.19 pixels. Therefore, the R and the B sub pixels provide the resolution that is 1.08 times as fine as that of the second pixel configuration 102 of RGB. The G and the Y sub pixels each having a smaller area provide resolution that is 1.73 times as fine as that of the second pixel configuration 102 of RGB.

In the embodiment according to the present invention, in the display panel whose each one pixel is configured by four or more sub pixels of different colors, high-brightness sub pixels that are the top two highest-brightness sub pixels, and the other sub pixels are alternately disposed and sub-pixel sampling is executed. Thereby, good video image appearance quality is able to be acquired. For example, in the embodiment according to the present invention, one pixel is arranged in order of RGBY. The reason of this is that, of R, G, B, and Y, the G and the Y sub pixels having the top two highest-brightness ratios, and the other two that are the R and the B sub pixels are alternately disposed.

When the brightness of each of G and Y having high brightness is sufficiently higher than the brightness of R and B, two brightness centers are produced by the high-brightness sub pixels that control the brightness in one pixel and, thereby, the resolution is able to be improved. By arranging the sub pixels in order of those for R, G, B, and Y, G and Y each having a high brightness ratio of R, G, B, and Y are disposed away from and not adjacent to each other. Thereby, an effect is achieved that is similar to that achieved when the spatial resolution is set to be high, and the video image appearance quality is able to be improved.

When the RGBC configuration is employed instead of the RGBY configuration, the G and the Y sub pixels of the G and the C sub pixels having the top two highest-brightness ratios, and the other two that are the R and the B sub pixels are alternately disposed.

Thereby, the high-brightness sub pixels and the others are alternately arranged in the configuration having pixels sequentially disposed therein, and the resolution is improved in the direction of the arrangement.

In the direction perpendicular to the direction of the arrangement of the sub pixels, the resolution of the whole pixel matrix is also able to be improved by alternately disposing the high-brightness sub pixels and the other sub pixels.

In the embodiment of the display device according to the present invention, in each one pixel, the area of each of the above high-brightness sub pixels is set to be smaller than that of each of the other sub pixels. For example, the area ratios of R, G, B, and Y in the pixel are set to be R:G:B:Y=1.6:1.0:1.6:1.0.

As described with reference to FIG. 3, for the fourth pixel configuration 104 having R, G, B, and Y disposed respectively with the area ratios of 1.6:1.0:1.6:1.0, it can be seen that the resolution corresponding to 0.31 pixels is acquired for each of R and B and the resolution corresponding to 0.19 pixels is acquired for each of G and Y. The apparent resolution is able to be improved by reducing the area ratios of the high-brightness sub pixels. Therefore, in the embodiment according to the present invention, the area of each of the high-brightness sub pixel dominating the brightness is set to be smaller than the area of each of the other sub pixels.

In the embodiment of the display device according to the present invention, the following is the basic technical ideas.
(1) In the display panel, each one pixel is configured by four or more sub pixels of different colors and display data based on an input video image signal is produced for each of the sub pixels and is displayed on the display panel.
(2) Of the four or more sub pixels of different colors, the top two highest-brightness sub pixels of different colors and the other two sub pixels of different colors are alternately disposed.
(3) In each one pixel, the area of each of the high-brightness sub pixels is set to be smaller than that of each of the other sub pixels. The sub pixels have four colors; the areas of the two high-brightness sub pixels of different colors are set to be equal to each other and set to be equal to those of the other two sub pixels of different colors; and the area ratios are set to be 1.0:1.6 for each of the two high-brightness sub pixels of different colors and for each of the other two sub pixels of different colors, as an example of desirable area ratios.

Based on this sub pixel disposition, the process of producing video image data is executed for each of the sub pixels using sub pixel sampling, etc., and the video image expression is executed. Thereby, a display device is able to be provided that enables expression with high resolution and that improves the degradation of the video image appearance quality.

FIG. 4 is a diagram of exemplary sub-pixel configurations applicable to the present invention. FIG. 4(A) depicts an example where one pixel is configured by sub pixels for R, G, B, and Y. In this example, of the R, G, B, and Y sub pixels, the top two highest-brightness sub pixels of different colors that are the G and the Y sub pixels, and the other two sub pixels of different colors that are the R and B sub pixels are alternately disposed as above.

"C (cyan)" may be used instead of Y (yellow) of R, G, B, and Y as depicted in FIG. 4(B). In this case, the top two highest-brightness colors are two colors of G and C.

In an example of FIG. 4(C), a pixel is configured using five sub pixels for five colors of R, G, B, Y, and C. In this case: "R, G, B, and Y" and "R, G, B, and C" each configure one pixel; and these pixels are disposed adjacent to each other. In this case, the top two highest-brightness sub pixels of different colors and the other two sub pixels of different colors are also alternately disposed in one pixel.

Figure 5:
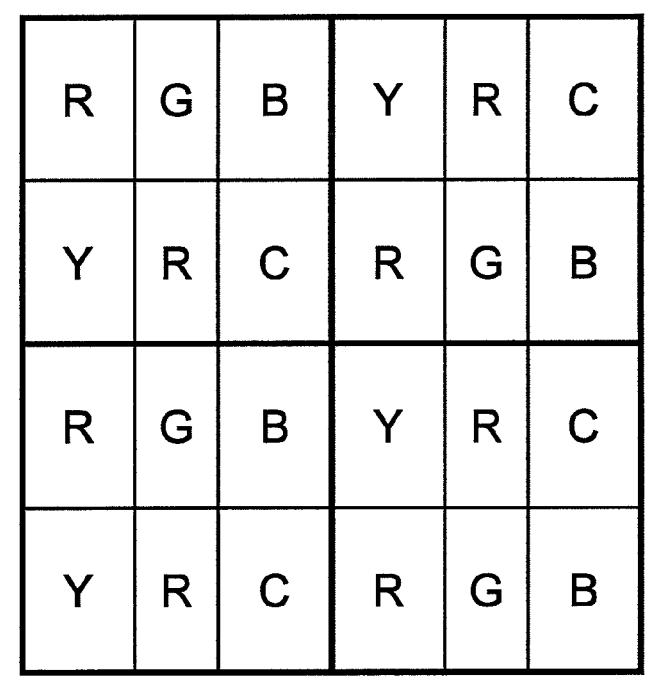

FIG. 5 is a diagram of another exemplary sub-pixel configuration applicable to the present invention. In this example, one pixel is configured by six sub pixels for six colors of R, G, B, Y, R, and C. In this case, the top two highest-brightness sub pixels are Y and C, and the highest-brightness sub pixel next to these is G. In this case, Y and C, and the other sub pixels are alternately disposed, and G is also disposed not adjacent to Y and C. An insufficient brightness ratio of R is compensated by disposing the R sub pixel at each of two positions in the one pixel. Thereby, a difference is generated in brightness between the horizontal and the vertical directions and, thereby, the high-resolution expression is enabled.

FIG. 6 is a diagram for explaining pixel sampling and sub-pixel sampling. FIG. 6(A) is a diagram for explaining the state of pixel sampling and FIG. 6(B) is a diagram for explaining the state of sub-pixel sampling. In FIG. 6, the axes of abscissa represent the position of a pixel in the X direction (an x position) and the pixel value (intensity) is represented in the vertical direction.

In the pixel sampling depicted in FIG. 6(A), the sampling is executed at one position for each pixel (pixel) for an input analog video image signal (input). For example, the sampling is executed for the input video image signal at a position corresponding to that of G of R, G, and B of each pixel. Denoting the pixel pitch in this case as "$\Delta x$", the sampling frequency fs is fs=$1/\Delta x$. The sampled data of each pixel is allocated to each of all of R, G, and B and the video image is displayed. Therefore, the pixel values of R, G, and B are same in each pixel. This approach is the pixel sampling.

In the pixel sampling, the R and the B sub pixels disposed on both sides of the G sub pixel are spatially shifted by $\pm\Delta x/3$ against the G sub pixel. In this case, though the input video image signals corresponding to the sub pixels each have its brightness and its color, the brightness component is dispersed and the spatial frequency property is degraded by executing the pixel sampling. The color component is also dispersed, and color shifting and distortion are generated.

Approaches such as sub-pixel rendering are conceived to improve the degradation and the distortion caused by the pixel sampling. The sub pixel rendering means to produce data of each sub pixel by interpolating a signal sampled by the pixel sampling between its sampling points, and spatially smooths sections between the sampling points.

The sub-pixel sampling depicted in FIG. 6(B) is not the one to produce data of each sub pixel by interpolating the data sampled for each sub pixel as above. However, the sub-pixel sampling is the one to acquire data by actually executing sampling for the input video image signal at intervals of sub pixels, and provides data that is more faithful to the input video image signal. In this sampling, the input video image signal is sampled at a sampling frequency fx that corresponds to sampling for each sub pixel. In this case, the sampling is executed for the R sub pixel shifting by $\Delta x/3$ from the G sub pixel and for the B sub pixel shifting by $-\Delta x/3$ from the G sub pixel, and the pixel values are allocated.

Exemplary processing will further be described of the sub-pixel rendering in the four-color pixel configuration.

FIG. 7 is a diagram of an example of states of pixel values of a video image signal, and its axes of abscissa represent the position of a pixel (x position) and its axes of ordinate represent the pixel value (Intensity). In the example of FIG. 6, the states of the pixel values are described acquired when sampling is executed from a continuous signal having a sufficient frequency band.

On the other hand, it is assumed that the frequency band is limited and discrete pixel values for three colors of R, G, and B are input as the input video image signal. The state of the pixel values in this case is depicted in FIG. 7(A).

The pixel values as depicted in FIG. 7(B) are acquired by converting the pixel values of FIG. 7(A) for three colors into the pixel values for four colors and allocating the pixel values. For example, when the pixel values for RGB are converted into the pixel values for RGBY, the same pixel values are continuously used for RGB and a pixel value is allocated to Y such that R and G are R=G, as the method of converting the pixel values for three colors into those for four colors. For example, when R and G are R=100 and G=80 for the pixel values for the three colors, Y is set to be Y=80 for the conversion into those for the four colors. When R and G are R=150 and G=200 for the pixel values for the three colors, Y is set to be Y=150 for the conversion into those for the three colors.

Figure 8:
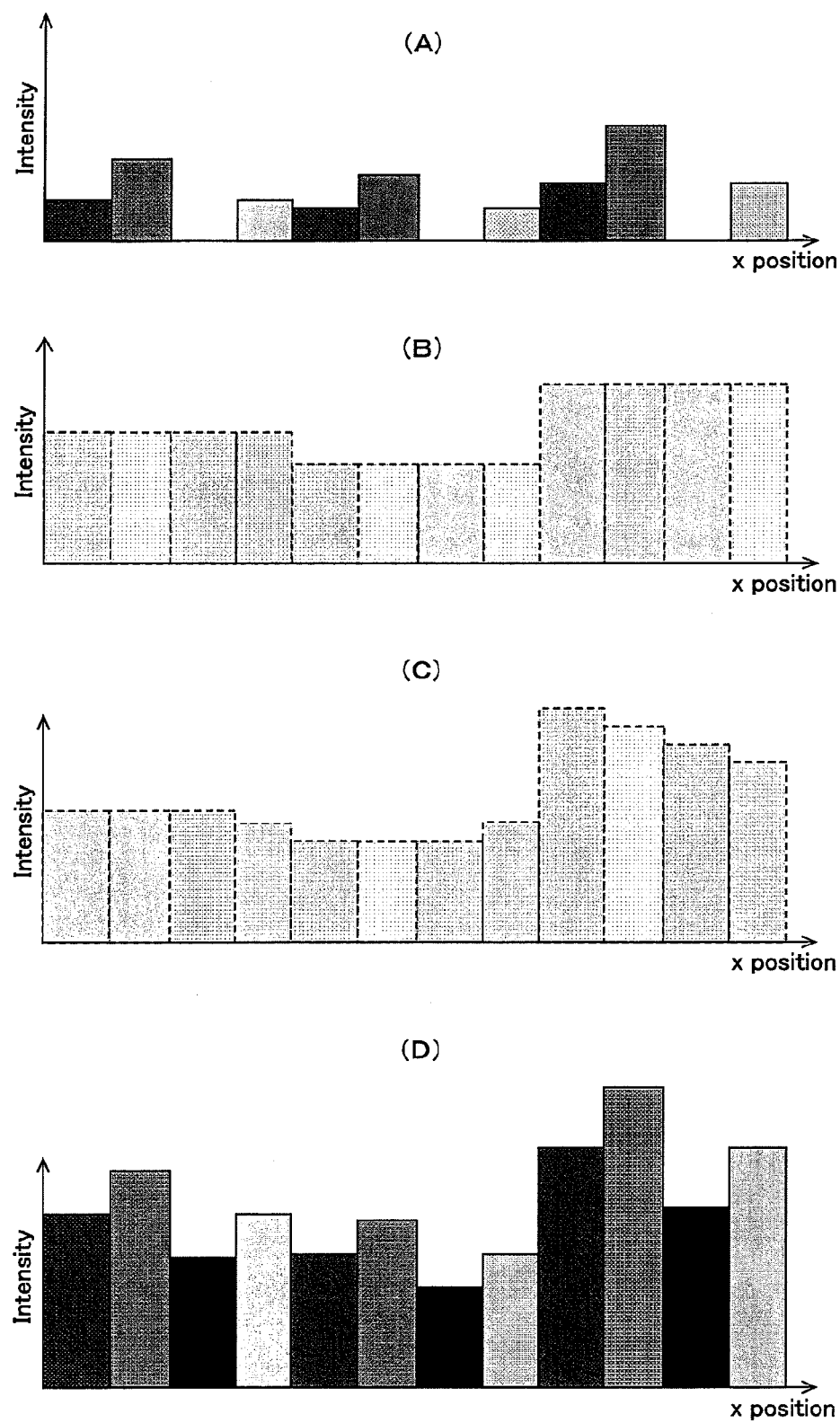
FIG. 8 is a diagram for explaining exemplary processes to execute enhancing and smoothing for brightness components of the pixel values of FIG. 7.

The pixel values of FIG. 7(B) for the four colors are each divided into a color component and a brightness component, and an enhancing and a smoothing processing are applied to the brightness component. FIG. 8 is a diagram of the states in this case. FIG. 8(A) depicts the state where the color component is separated from each of the pixel values of FIG. 7(B) (the pixel values of the color components) and FIG. 8(B) depicts the state where the brightness component is separated from each of the pixel values of FIG. 7(B) (the pixel values of the brightness components). The enhancing processing and the smoothing processing are executed for the brightness components of FIG. 8(B).

In the enhancing processing, a high frequency component and a low frequency component are separated from each other by executing an HPF (High-pass filter) processing for the brightness component for each sub pixel. The enhancing is executed by applying a gain only to the high frequency component. Thereafter, the high frequency component enhanced is coupled with the low frequency component. Thereby, a blurry image is enhanced and the sharpness of the image is enhanced. In the smoothing processing, an LPF (Low-pass filter) processing is executed for the brightness component coupled in the enhancing processing. Executing only the enhancing processing may cause degradation of the image quality due to shagginess and noises. Therefore, the image quality is adjusted by the smoothing processing to acquire a smooth image quality. FIG. 8(C) is a diagram of the state of the brightness component acquired.

The color component depicted in FIG. 8(A) and the brightness component after undergoing the enhancing processing and the smoothing processing are again coupled with each other, and the resultant component is output. FIG. 8(D) depicts the state of the pixel in this case.

The above processing enables sub-pixel processing to be executed even when only the data of discrete pixel values is present as the input image data. According to this processing, even in the case where, for example, a black-and-white image is input, when the tone spatially varies in a portion thereof, in such a portion, the pixel values of the sub pixels in each one pixel are not equal and the sharpness of the brightness is improved.

Using simulation results, the display states will be described below that are acquired when the sub-pixel sampling is executed using an RGBY arrangement and a video image is displayed whose spatial frequency is high.

The states of the video image appearance quality corresponding to the difference in the pixel arrangement and the sampling method will be compared with each other using the simulation. The video images evaluated using the simulation are:

(1) a video image acquired by the pixel sampling using the RGB pixel configuration;
(2) a video image acquired by the sub-pixel sampling using the RGB pixel configuration;
(3) a video image acquired by the pixel sampling using the RGBY pixel configuration; and
(4) a video image acquired by the sub-pixel sampling using the RGBY pixel configuration. A video image acquired by the sub-pixel sampling using RGBW is also evaluated to check the state acquired when the brightness values of the sub pixels are varied.

The processing according to the present invention of producing display data based on an input video image signal for each sub pixel is applicable to any of the sub-pixel sampling processing and the sub-pixel rendering processing. An example will be described below where simulation is executed by the sub-pixel sampling and the pixel sampling.

Figure 9:
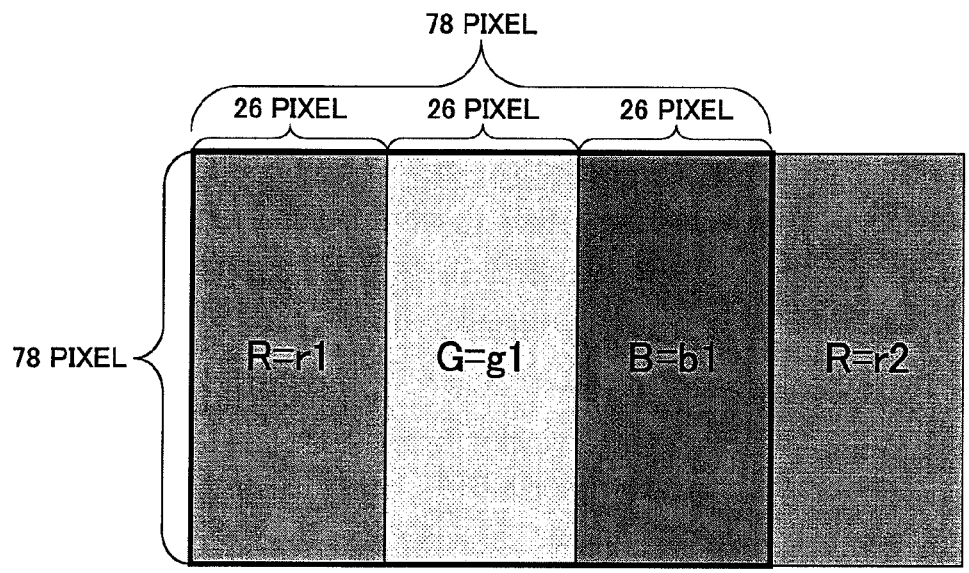
FIG. 9 is a diagram of an RGB pixel configuration for executing simulation.

FIG. 9 is a diagram of the RGB pixel configuration for executing the simulation. In the simulation, the sampling method of the input video image signal is changed using the C language and a bit map of the brightness component is produced. In this simulation, a zone plate is used that is defined by the equation below as a signal source of the input video image. The "zone plate" is a black-and-white video image whose spatial frequency becomes higher as the distance from an origin becomes longer centering the origin.

$$f(x,y)=128\,COS((\pi/\text{imagewidth})x^2)+(\pi/\text{imageheight})y^2))+127 \quad \text{Equation (1)}$$

Where, "x" and "y" are coordinates in the image, "imagewidth" is the image width, and "imageheight" is the image height. The function f(x,y) is a function that expresses a pixel value of a pixel at a position (x, y) in the data of the spatial region, that is, the image data.

Simulation is executed for a zone plate of 100×100 pixels according to Equation (1). This simulation is executed using 78×78 pixels in the bit map as one pixel as depicted in FIG. 9. The bit map for one zone plate includes 7,800×7,800 pixels. The sub pixels are arranged in order of RGB and are each configured by a bit map having a width of 26 pixels. The area ratios of RGB are 1:1:1.

Sampling is executed from the input video signal of the zone plate and data is produced for 300×100 pixels including the sub pixels. Hereinafter, the term "pixel" does not correspond to each pixel constituting a bit map but corresponds to a pixel (pixel) or a sub pixel (sub pixel) in the RGB configuration for executing the simulation.

When the pixel sampling is simulated, a pixel value is formed according to Equation (1) at the position of G in each pixel. In this case, the brightness components of the pixel are R=G=B based on the pixel value of G.

When the sub-pixel sampling is simulated, the brightness component of the pixel value of each sub pixel is acquired by calculation from that of the sub pixel to be simulated and those of the sub pixels on both sides thereof.

In the simulation, the pixel value is calculated according to Equation (1) for each of the sub pixel for R, G, and B corresponding to the position of each of the sub pixels. The brightness component is extracted from the pixel value for each of the sub pixels. In this case, the brightness component of the sub pixel to be simulated is calculated from the pixel values of the sub pixels on both sides of the sub pixel.

For example, in the configuration having the sub pixels for R, G, and B arranged therein as in FIG. 9, the brightness component of a sub pixel that is G=g1 is acquired from pixel values r1 and b1 respectively of R and B that are the sub pixels on both sides of G, and a pixel value g1 of the sub pixel G.

In this case, the brightness component is acquired according to the equation;

brightness component=$0.30 \times r1+0.59 \times g1+0.11 \times b1$ using the brightness ratios acquired when white is displayed using RGB as the coefficients.

Similarly, the brightness component of a sub pixel having B that is B=b1 is acquired from the pixel value g1 of G that is the sub pixel on each of both sides thereof, a pixel value r2 of R that is the pixel on the right side next to G, and the pixel value b1 of the sub pixel B. In this case, the brightness component is acquired according to the equation;

brightness component=$0.30 \times r2+0.59 \times g1+0.11 \times b1$.

As above, video image expression close to the actual visual appearance is able to be simulated by using the pixel values of the sub pixels on both sides of the sub pixel noted.

Figure 10:
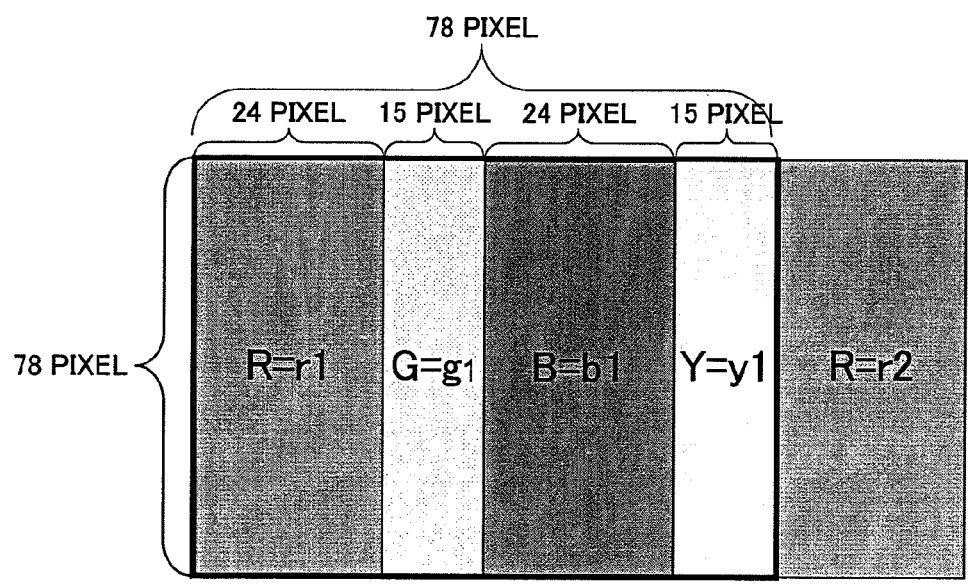
FIG. 10 is a diagram of an RGBY pixel configuration for executing the simulation.

FIG. 10 is a diagram of the RGBY pixel configuration for executing the simulation. Similarly to the example of FIG. 9, simulation is executed for a zone plate of 100×100 pixels according to Equation (1). Similarly to the example of FIG. 9, the simulation is executed using 78×78 in the bit map (the number of pixels in the bit map) as one pixel. Therefore, the bit map for one zone plate includes 7,800×7,800. The sub pixels are arranged in order of RGBY and are each configured by bit maps having widths of 24, 15, 24, and 15. The area ratios of RGBY are 1.6:1.0:1.6:1.0. Data is produced for 300×100 pixels including the sub pixels by executing the sampling from the input video image signal of the zone plate.

When the pixel sampling is simulated, for example, a pixel value is formed according to Equation (1) at the position of G of each pixel. In this case, the brightness components of the pixel are R=G=B=Y based on the pixel value of G.

When the sub pixel sampling is simulated, the brightness component of the pixel value of each sub pixel is acquired by calculation from that of the sub pixel to be simulated and those of the sub pixels on both sides thereof.

In this case, the pixel value is calculated according to Equation (1) for each of the sub pixels for R, G, B, and Y corresponding to the position thereof. The brightness component is extracted from the pixel value for each of the sub pixels. In this case, the brightness component of the sub pixel to be simulated is calculated using the pixel values of the sub pixels adjacent to the sub pixel.

For example, for the configuration having therein the sub pixels for R, G, B, and y arranged as in FIG. 10, the brightness component of the sub pixel of B that is B=b1 is acquired from the pixel values g1 and y1 of G and Y that are the sub pixels adjacent to the sub pixel for B, the pixel value b1 of the sub pixel for B, and the pixel value r1 of the sub pixel for R.

In this case, using as coefficients the brightness ratios acquired when white is displayed using RGBY, the brightness component is acquired according to the equation;

$$\text{brightness component} = 0.120437475 \times r1 + 0.34378706 \times g1 + 0.103175649 \times b1 + 0.432599816 \times y1.$$

The coefficients in this case are determined based on actually measured primary color brightness ratios calculated using the result of optical measurement of a screen executed by illuminating the pixels for RGBY using an LED backlight.

Similarly, the brightness component of the sub pixel of Y that is Y=y1 is acquired from the pixel values b1 and r2 of B that is the sub pixel on each of both sides of Y and R that is the second next pixel of and on the right of Y, the pixel value y1 of the sub pixel Y, and the pixel value g1 of G.

In this case, the brightness component is acquired according to the equation;

$$\text{brightness component} = 0.120437475 \times r2 + 0.34378706 \times g1 + 0.103175649 \times b1 + 0.432599816 \times y1.$$

The reason why the pixel value g1 is used of the sub pixel for G positioned on the left of Y is that, when the pixel values are calculated from the left to the right, the pixel value is always calculated of the sub pixel positioned on the left of the sub pixel whose pixel values is to be calculated.

As above, the video image expression close to the actual visual appearance is able to be simulated by using the pixel values of the sub pixels adjacent to the sub pixel noted.

Examples of the image produced by the above simulation will be described below.

Figure 11:
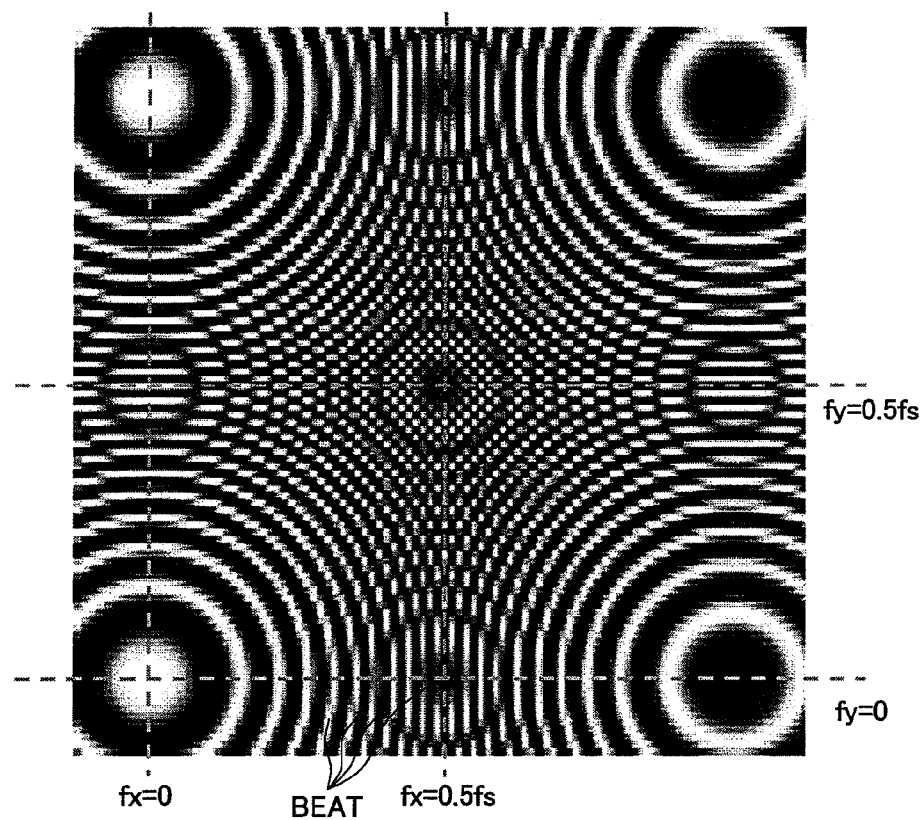
FIG. 11 is a diagram of a spatial frequency response of a brightness component acquired when the pixel sampling is executed using the RGB pixel configuration.

FIG. 11 is a diagram of a spatial frequency response of a brightness component acquired when the pixel sampling is executed using the RGB pixel configuration. As above, the input video image source is a zone plate according to Equation (1). The input frequency fs in this case is fs=1/Δx (sampling frequency). Therefore, 0.5fs is the Nyquist frequency.

The spatial frequency of the zone plate is zero at a position at which fx is fx=0, and the spatial frequency increases toward the right. The spatial frequency similarly varies in the y-direction. However, the pixels are arranged in the horizontal direction (x-direction) in the simulation and, therefore, the pixel arrangement and the sampling method are evaluated noting the state of the image in the x-direction.

According to the result of FIG. 11, in the pixel sampling using RGB, the spatial frequency of the zone plate is substantially reproduced to a frequency around the Nyquist frequency as the spatial frequency of the zone plate becomes higher toward the right from the frequency with which Fx is fx=0. Sampling errors are generated at frequencies exceeding the Nyquist frequency and the spatial frequency is expressed as if the spatial frequency becomes lower. Therefore, the evaluation must be executed for the Nyquist and lower frequencies at which no sampling error is generated.

In the example, it is obvious that beats (an interference pattern) are generated centering a frequency around the Nyquist frequency and, thereby, the characteristics is degraded. The beats adversely influence the video image appearance quality and are undesirable.

Figure 12:
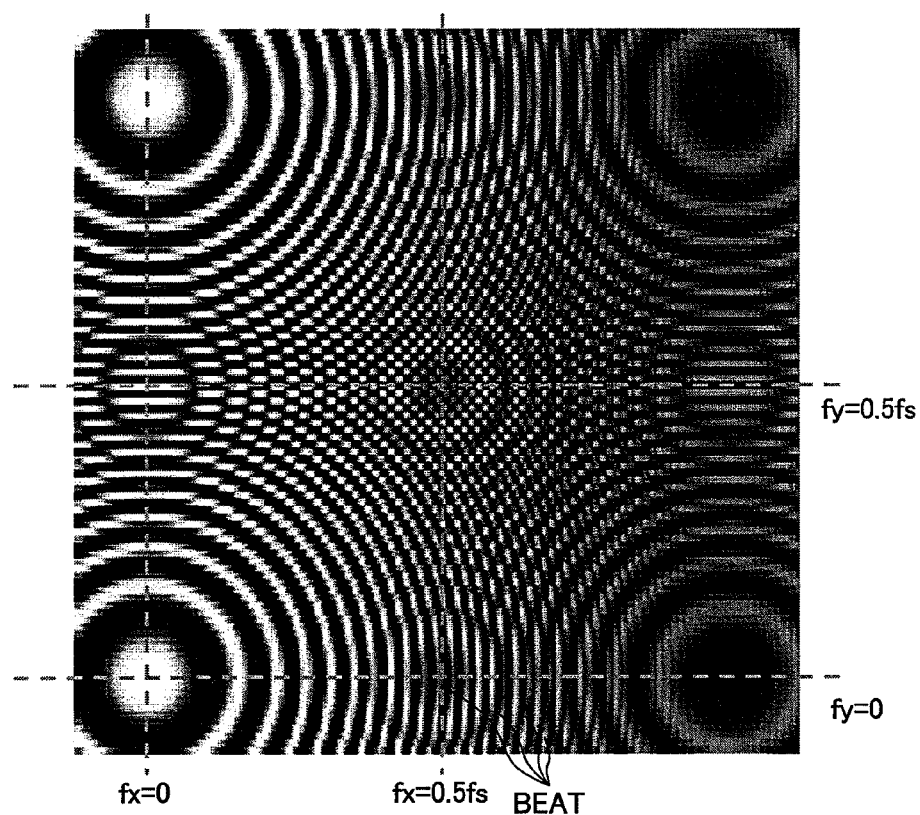
FIG. 12 is a diagram of a spatial frequency response of the brightness component acquired when the sub-pixel sampling is executed using the RGB pixel configuration.

FIG. 12 is a diagram of a spatial frequency response of the brightness component acquired when the sub-pixel sampling is executed using the RGB pixel configuration. The conditions of the zone plate and the input frequency fs are the same as those of FIG. 11 and the input frequency fs is 1/Δx (the sampling frequency for the pixel sampling). In other examples below, the conditions of the zone plate and the sampling frequency used are same as above.

According to the result of FIG. 12, though beats (an interference pattern) are generated centering a frequency around the Nyquist frequency, the characteristics is more improved than the example of FIG. 11 where the pixel sampling is executed. In this manner, with the RGB pixel configuration, though the characteristics is more improved by executing the sub pixel sampling than executing the pixel sampling, the video image appearance quality is degraded by the beats in both of the sampling sessions.

Figure 13:
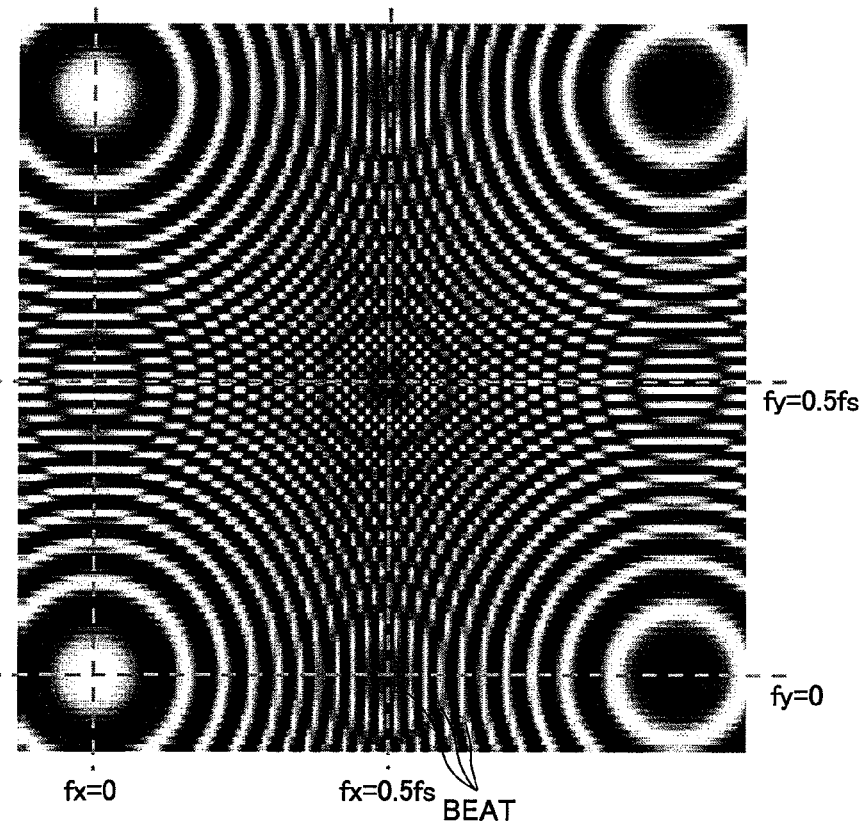
FIG. 13 is a diagram of a spatial frequency response of the brightness component acquired when the pixel sampling is executed using the RBGY pixel configuration.

FIG. 13 is a diagram of a spatial frequency response of the brightness component acquired when the pixel sampling is executed using the RBGY pixel configuration. In this case, the arrangement order of the sub pixels is not the order of RGBY as depicted in FIG. 10 but is order of RBGY. The area ratios of the sub pixels are same as those of FIG. 10 and are ratios of 1.6 for the sub pixels for R and B, and 1.0 for the sub pixels for G and Y.

According to the result of FIG. 13, beats (an interference pattern) are generated centering a frequency around the Nyquist frequency. The level of the characteristics is lower than that of the pixel sampling using RGB.

It can be seen that the video image appearance quality is degraded due to the beats when the pixel sampling is executed using the RBGY pixel configuration.

Figure 14:
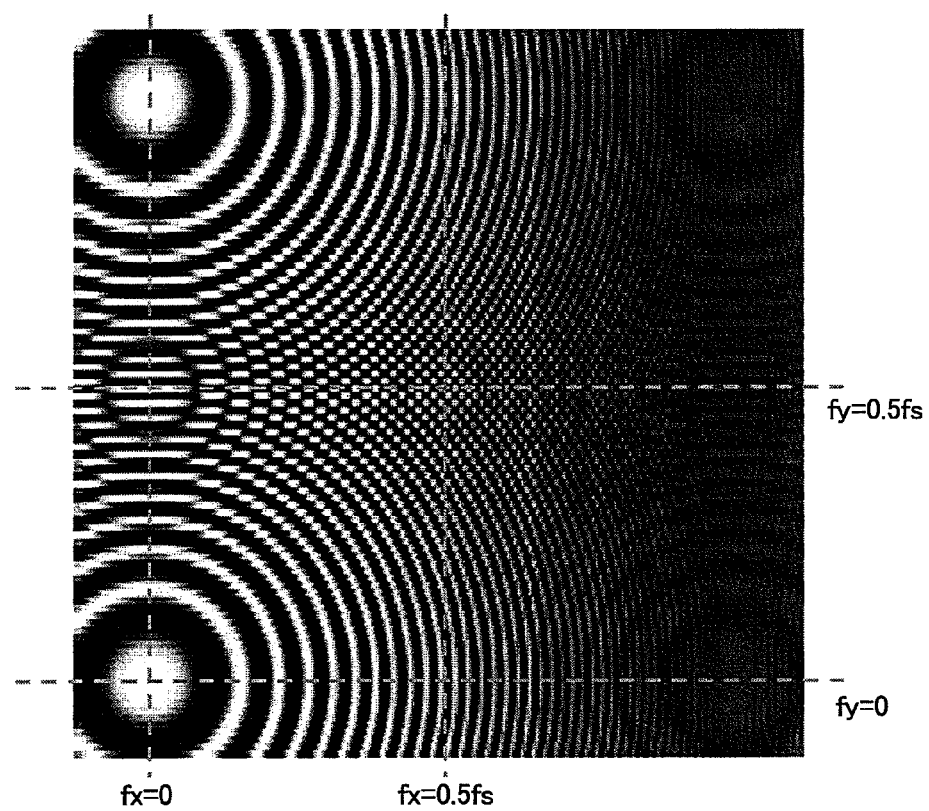
FIG. 14 is a diagram of a spatial frequency response of the brightness component acquired when the pixel sampling is executed using the RGBY pixel configuration.

FIG. 14 is a diagram of a spatial frequency response of the brightness component acquired when the sub-pixel sampling is executed using the RGBY pixel configuration. The arrangement order of the sub pixels is the order of RGBY as depicted in FIG. 10. The area ratios of the sub pixels are ratios of 1.6 for the sub pixels for R and B, and 1.0 for the sub pixels for G and Y.

According to the result of FIG. 14, it can be seen that substantially no beat is present in the x-direction and substantially no degradation is generated of the video image appearance quality due to the beats. Comparing FIGS. 13 and 14 with each other, though the pixel sampling is executed using the same four-color disposition, the beats are generated for the RBGY sub pixel disposition and substantially no generation of any beat is observed for the RGBY sub pixel disposition.

Figure 15:
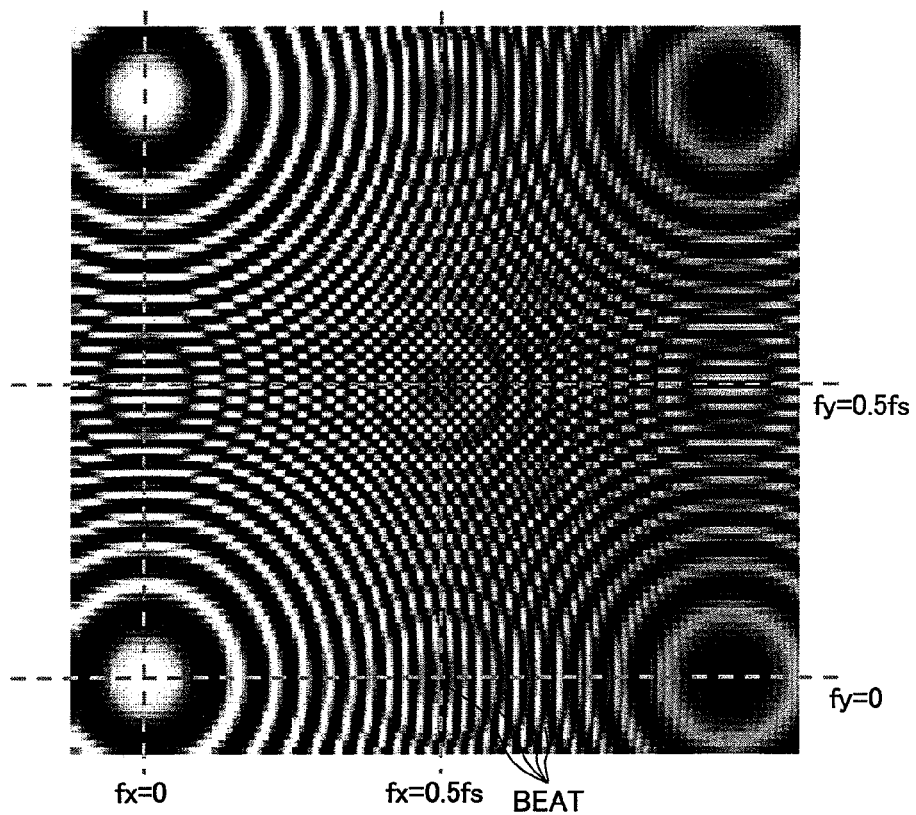
FIG. 15 is a diagram of a spatial frequency response of the brightness component acquired when the sub-pixel sampling is executed using an RGYB pixel configuration.

FIG. 15 is a diagram of a spatial frequency response of the brightness component acquired when the sub-pixel sampling is executed using an RGYB pixel configuration. In this case, the arrangement order of the sub pixels is different from those of FIGS. 13 and 14, and is order of RGYB. The area ratios of the sub pixels are ratios of 1.6 for the sub pixels for R and B, and 1.0 for the sub pixels for G and Y.

According to the result of FIG. 15, beats (an interference pattern) are generated centering a frequency around the Nyquist frequency. The level of the characteristics is the same as that acquired when the sub-pixel sampling is executed using the RGB pixel configuration. Comparing FIGS. 14 and 15 with each other, though the sub-pixel sampling sessions are executed using the same four colors of RGBY, the characteristics differs for each session due to the disposition order of the sub pixels. It can be seen that the characteristics is better with the disposition in the order of RGBY than that with the disposition in the order of RGYB.

Figure 16:
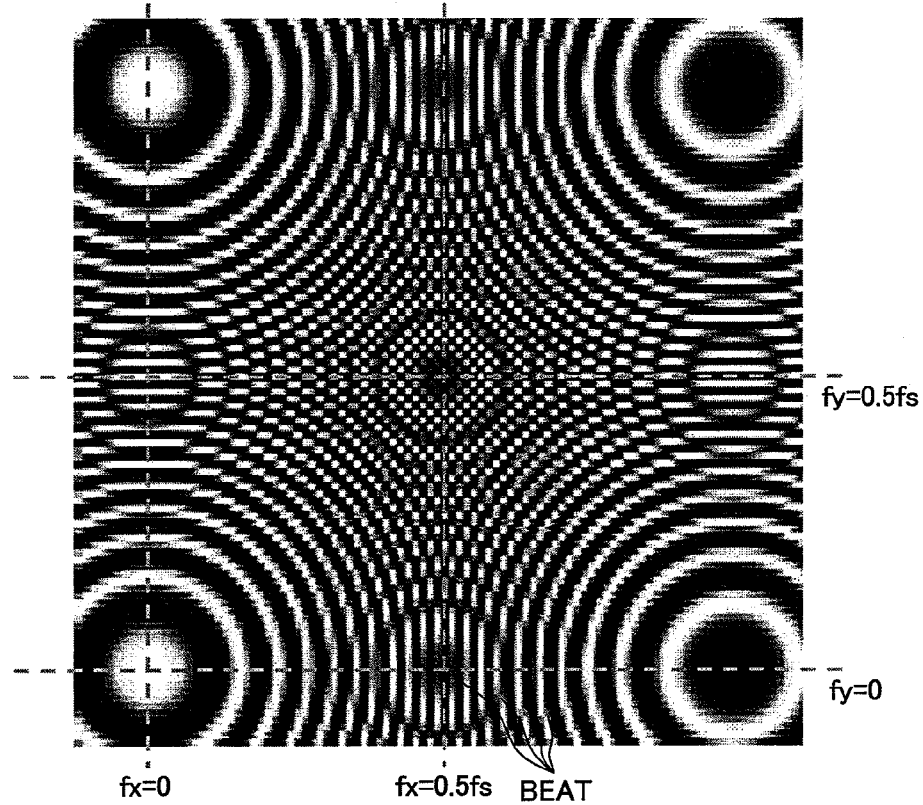
FIG. 16 is a diagram of a spatial frequency response of the brightness component acquired when the pixel sampling is executed using the RGYB pixel configuration.

FIG. 16 is a diagram of a spatial frequency response of the brightness component acquired when the pixel sampling is executed using the RGYB pixel configuration. In this case, the arrangement order of the sub pixels is same as that of FIG. 15 and is order of RGYB. The area ratios of the sub pixels are ratios of 1.6 for the sub pixels for R and B and 1.0 for the sub pixels for G and Y.

According to the result of FIG. 16, beats (an interference pattern) are generated centering a frequency around the Nyquist frequency. The level of the characteristics is same as that acquired when the pixel sampling is executed using the RGB image configuration. It can be seen that, when the pixel sampling is executed with the order of RGYB, the characteristics is degraded similarly to that of the pixel sampling with RGB.

Figure 17:
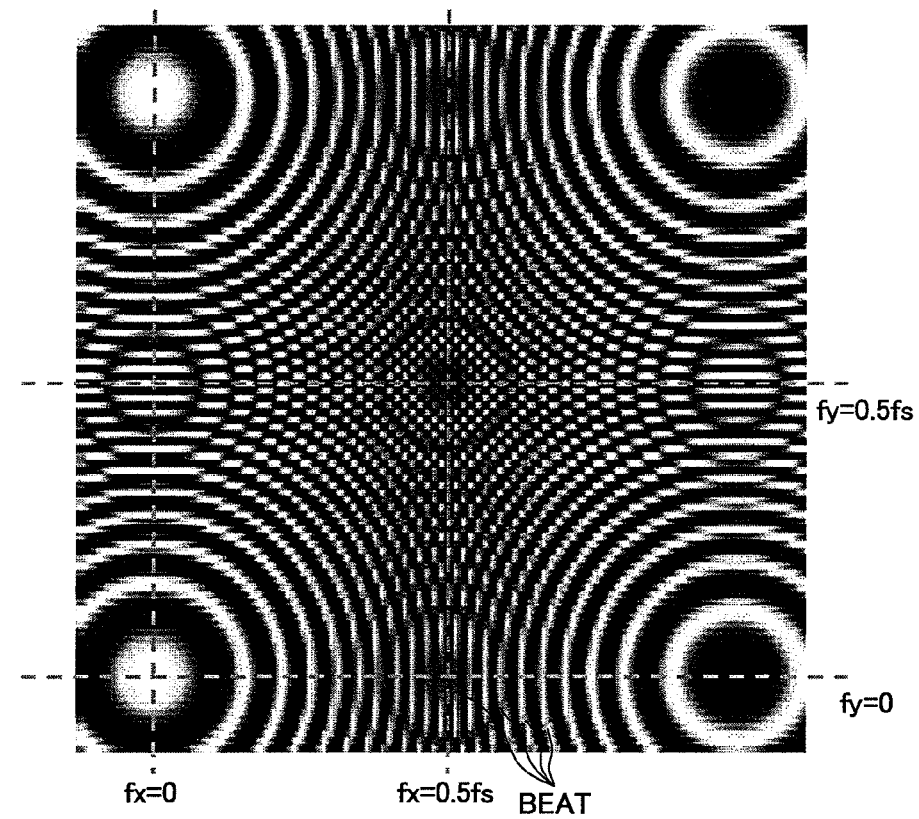
FIG. 17 is a diagram of a spatial frequency response of the brightness component acquired when the pixel sampling is executed using an RGBW pixel configuration.

FIG. 17 is a diagram of a spatial frequency response of the brightness component acquired when the pixel sampling is executed using an RGBW (white) pixel configuration. A sub pixel for "W (white)" is disposed in stead of Y of RGBY of FIG. 14 as the arrangement order of the sub pixels. The brightness ratio of white in this case is 55% and the simulation is executed with this sub pixel as a sub pixel having the brightness ratio that is higher than the brightness ratio (about 43%) of Y used in RGBY. The area ratios of the sub pixels are ratios of 1.6 for the sub pixels for R and B and 1.0 for the sub pixels for G and W.

According to the result of FIG. 17, beats (an interference pattern) are generated centering a frequency around the Nyquist frequency. The level of the characteristics is the same as that acquired when the pixel sampling is executed using the RGBY image configuration. In this session, the pixel sampling is executed using W having the brightness ratio higher than that of Y instead of Y of RGBY, and degradation of the characteristics is observed due to the beats in both of the sessions.

Figure 18:
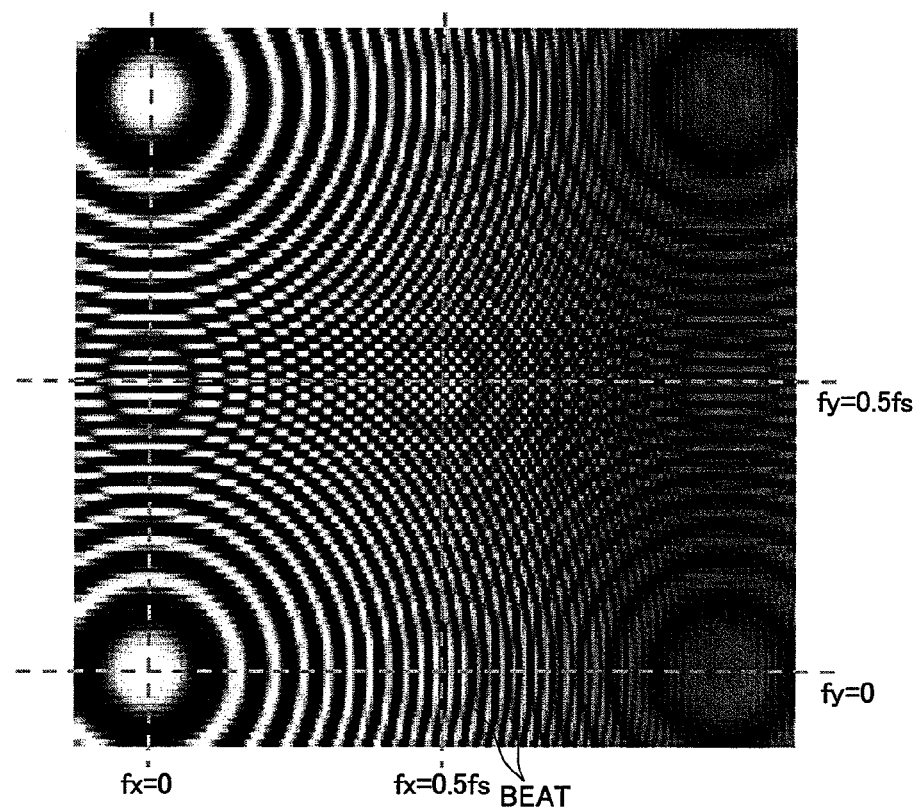
FIG. 18 is a diagram of a spatial frequency response of the brightness component acquired when the sub-pixel sampling is executed using the RGBW pixel configuration.

FIG. 18 is a diagram of a spatial frequency response of the brightness component acquired when the sub-pixel sampling is executed using the RGBW (white) pixel configuration. The arrangement order of the sub pixels is same as that of FIG. 17 and is order of RGBYW. The brightness ratio of white in this case is set to be 55%. The area ratios of the sub pixels are ratios of 1.6 for the sub pixels for R and B and 1.0 for the sub pixels for G and W.

According to the result of FIG. 18, beats (an interference pattern) are slightly generated centering a frequency around the Nyquist frequency. The level of the characteristics is somewhat lower than that acquired when the sub-pixel sampling is executed using the RGBY image configuration. In this session, the sub-pixel sampling is executed using W having the brightness ratio higher than that of Y instead of Y of RGBY. However, the characteristics is somewhat degraded that is acquired when the sub pixel for W is used that has the high brightness ratio.

FIGS. 19 to 22 are diagrams of frequency responses of the brightness component acquired when the brightness ratio of W is varied with the same configuration as the pixel configuration of RGBW of FIG. 14. Therefore, the arrangement order of the sub pixels is order of RGBW. The area ratios of the sub pixels are ratios of 1.6 for the sub pixels for R and B and 1.0 for the sub pixels for G and W.

Figure 19:
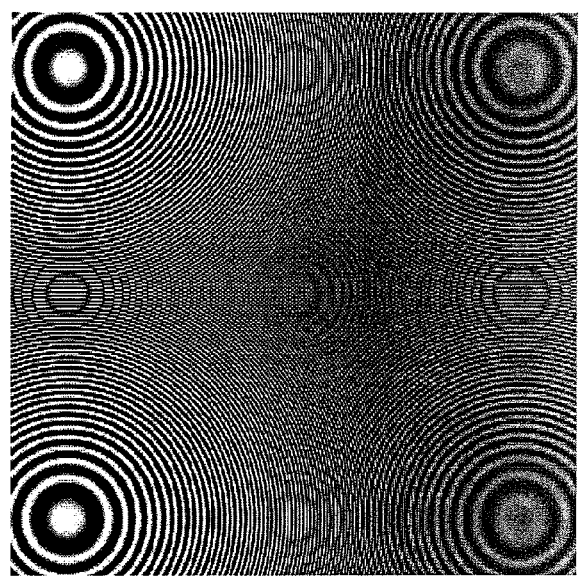
FIG. 19 is a diagram of a frequency response of the brightness component acquired when a brightness ratio of W is varied with the same configuration as the RGBW pixel configuration.
Figure 20:
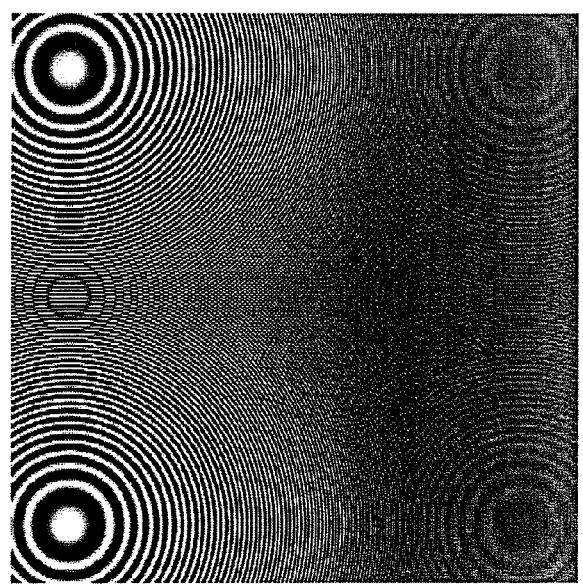
FIG. 20 is another diagram of the frequency response of the brightness component acquired when the brightness ratio of W is varied with the same configuration as the RGBW pixel configuration.
Figure 21:
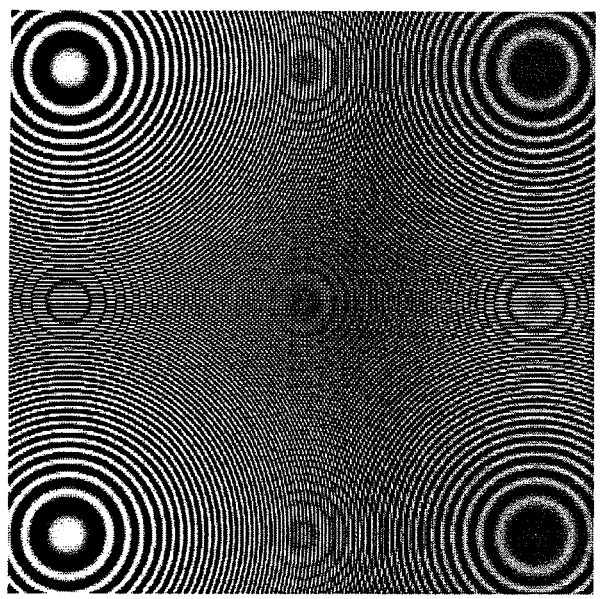
FIG. 21 is yet another diagram of the frequency response of the brightness component acquired when the brightness ratio of W is varied with the same configuration as the RGBW pixel configuration.
Figure 22:
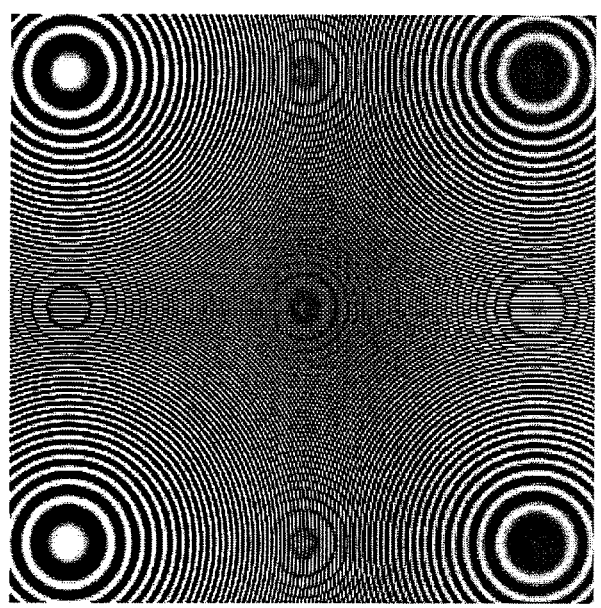
FIG. 22 is yet another diagram of a frequency response of the brightness component acquired when the brightness ratio of W is varied with the same configuration as the RGBW pixel configuration.

FIG. 19 depicts a frequency response acquired when the brightness ratio of W is 60% (R=8%, G=31%, and B=5%). In FIG. 20, the brightness ratio of W is 40% (R=12%, G=42%, and B=6%). In FIG. 21, the brightness ratio of W is 20% (R=16%, G=56%, and B=8%). In FIG. 22, the brightness ratio of W is 10% (R=18%, G=63%, and B=9%).

According to the results of FIGS. 19 to 22, in the case where the brightness ratio of W is varied with the RGBW sub-pixel configuration, when the brightness ratio of G and the brightness ratio of W are equal, the characteristics becomes the best. Of the results, the characteristics of FIG. 20 is the best and, when the brightness ratio of W and the brightness ratio of G are close to each other (W=40% and G=42%), the characteristics becomes the best.

Considering the results of the simulation sessions, for the RGB pixel configuration, the characteristics is degraded due to the beats in any of the sampling sessions. However, the characteristics is better that is acquired by the sub-pixel sampling than that by the pixel sampling. With the RGB pixel configuration, the characteristics is able to be improved when the sub-pixel sampling is executed. However, in the case where a video image is input whose spatial frequency is high as the zone plate of the example, the video image appearance quality is degraded even when the sub-pixel sampling is executed.

For the pixel configuration having therein the arrangement in the order of RGBY, though the characteristics is degraded by the pixel sampling, a good characteristics is able to be acquired by executing the sub-pixel sampling. From the sub-pixel sampling of RGBY, the best frequency response characteristics of the brightness component is acquired in the simulation.

As to the disposition order of the sub pixels, for the pixel sampling, the characteristics acquired with the disposition in the order of RGBY is worse than, and the characteristics acquired with the disposition in the order of RGYB is better than that acquired by the pixel sampling with RGB. For the sub-pixel sampling, the characteristics is good with the disposition in the order of RGBY and is better than that with the disposition in the order of RGYB.

It can be seen that the characteristics is good with the disposition in the order of RGBY when the sub-pixel sampling is executed.

As above, the best simulation result is acquired by executing the sub-pixel sampling with the order of RGBY of FIG. 14. It is considered that this is because, for the four-primary-color pixel configuration, the high spatial resolution response is able to be acquired by disposing G and Y away from each other each having the high brightness component and alternately disposing these pixels and the pixels each having low brightness.

Comparing the simulation results with each other of the sub-pixel sampling of RGBY of FIG. 14 and the sub-pixel sampling of RGYB of FIG. 15, the response in the horizontal direction for RGBY extends to a length twice as long as the other. It is considered about this that one pixel is usable as two pixels by dispersing the brightness by arranging in the order of RGBY.

However, it can be seen that, even in the case where the arrangement is in the order of RGBY, when not the sub-pixel sampling but the pixel sampling is executed, the characteristics is degraded because the brightness of one pixel is dispersed.

It can be seen from the simulation result with the RGBW pixel configuration that the characteristics is the best when two sub pixels each having a high brightness component (G and W in the simulation) have substantially equal brightness.

The apparent resolution is able to be improved by reducing the area ratios of the sub pixels having high brightness as above and, therefore, the characteristics is able to be improved by setting the area of each of the sub pixels having high brightness to be smaller than the area of each of other sub pixels.

As above, from the result of the simulation, it is confirmed that such technical ideas of the display device according to the present invention improve the characteristics of a video image, as that (1) in the display panel, each one pixel is configured by four or more sub pixels of different colors, and display data based on an input video image signal is produced for each of the sub pixels and is displayed thereon, and that (2) of the four or more sub pixels of different colors, the top two highest-brightness sub pixels of different colors and the other two sub pixels of different colors are alternately disposed.

(3) In each one pixel, the area of each of the high-brightness sub pixels is set to be smaller than that of each of the other sub pixels. An example of desirable area ratios can be as follows: the colors of the sub pixels are configured by four colors; the areas of the two high-brightness sub pixels of different colors are set to be equal to each other and set to be equal to those of the other two sub pixels of different colors; and the area ratio is set to be 1.0:1.6 of the area of each of the two high-brightness sub pixels of different colors and that of each of the other two sub pixels of different colors.

EXPLANATIONS OF LETTERS OR NUMERALS

1 . . . display portion, 2 . . . input portion, 3 . . . video image processing circuit, 4 . . . control portion, 5 . . . light source control circuit, 6 . . . drive control circuit, 7 . . . color filter, 8 . . . liquid crystal panel main body, 9 . . . backlight light source, 11 . . . display control circuit, 12 . . . converting circuit, 13 . . . data signal line driving circuit, 14 . . . scanning signal line driving circuit, 61 . . . display control circuit, and 62 . . . converting circuit.

The invention claimed is:

1. A display device comprising:
a display panel in which one pixel is composed of four sub pixels for four colors of red, green, blue, and yellow; and
a display control portion that produces display data based on an input video image signal for each of the sub pixels, the display control portion causing the display panel to display the display data thereon, wherein
on the display panel, the high-brightness sub pixels for green and yellow that are top two highest-brightness sub pixels and the other sub pixels for red and blue are alternately disposed in order of red, green, blue, and yellow,
areas of the top two highest-brightness sub pixels are equal to each other,
areas of the other two sub pixels are equal to each other,
a ratio of the area of each of the top two highest-brightness sub pixels to the area of each of the other two sub pixels is 1.0:1.6, and
the display control portion executes sampling for the input video image signal corresponding to positions of the sub pixels regarding each of the sub pixels as one pixel, and executes sub-pixel sampling to produce the display data for each of the sub pixels.

2. A television receiver comprising:
a display device including,
   a display panel in which one pixel is composed of four sub pixels for four colors of red, green, blue, and yellow; and
   a display control portion that produces display data based on an input video image signal for each of the sub pixels, the display control portion causing the display panel to display the display data thereon, wherein
on the display panel, the high-brightness sub pixels for green and yellow that are top two highest-brightness sub pixels and the other sub pixels for red and blue are alternately disposed in order of red, green, blue, and yellow,
areas of the top two highest-brightness sub pixels are equal to each other,
areas of the other two sub pixels are equal to each other,
a ratio of the area of each of the top two highest-brightness sub pixels to the area of each of the other two sub pixels is 1.0:1.6, and
the display control portion executes sampling for the input video image signal corresponding to positions of the sub pixels regarding each of the sub pixels as one pixel, and executes sub-pixel sampling to produce the display data for each of the sub pixels.

* * * * *